(12) United States Patent
Matsumaru

(10) Patent No.: US 9,676,036 B2
(45) Date of Patent: Jun. 13, 2017

(54) POLYGON MACHINING DEVICE AND POLYGON MACHINING METHOD

(71) Applicants: CITIZEN WATCH CO., LTD., Tokyo (JP); CITIZEN MACHINERY CO., LTD., Nagano (JP)

(72) Inventor: Hajime Matsumaru, Saitama (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 0 days.

(21) Appl. No.: 14/779,325

(22) PCT Filed: Mar. 7, 2014

(86) PCT No.: PCT/JP2014/056040
§ 371 (c)(1),
(2) Date: Sep. 22, 2015

(87) PCT Pub. No.: WO2014/156571
PCT Pub. Date: Oct. 2, 2014

(65) Prior Publication Data
US 2016/0045959 A1 Feb. 18, 2016

(30) Foreign Application Priority Data
Mar. 28, 2013 (JP) .................. 2013-069445

(51) Int. Cl.
B23B 5/00 (2006.01)
B23B 5/36 (2006.01)
B23Q 27/00 (2006.01)

(52) U.S. Cl.
CPC ................ *B23B 5/36* (2013.01); *B23Q 27/00* (2013.01); *B23Q 27/006* (2013.01);
(Continued)

(58) Field of Classification Search
CPC .......... G05B 19/39; G05B 19/00; B23B 5/36; B23B 2265/32
See application file for complete search history.

(56) References Cited

U.S. PATENT DOCUMENTS 4,092,720 A * 5/1978 Carey .................. G05B 19/195
700/181
4,204,442 A 5/1980 Nomura
(Continued)

FOREIGN PATENT DOCUMENTS

CN 1788891 A 6/2006
CN 201214148 Y 4/2009
(Continued)

OTHER PUBLICATIONS

Written Opinion of the International Searching Authority for PCT/JP2014/056040, Jun. 10, 2014.
(Continued)

*Primary Examiner* — Will Fridie, Jr

(57) ABSTRACT

A polygon machining method whereby first polygon machining using a polygon cutter is carried out on a workpiece, followed by machining using tools other than the polygon cutter, then second polygon machining using the polygon cutter again. The polygon machining method comprises: a first polygon machining step in which a main axis and a tool main axis are synchronously rotated such that the rotation speed of the main axis and the tool main axis are at a ratio required for the first polygon machining, and polygon machining is carried out; a machining step in which the ratio is changed to a second synchronization ratio such that the main axis rotates at a rotation speed required for machining after the first polygon machining, the main axis and the tool main axis are synchronously rotated, and machining is carried out on the workpiece that has received the first polygon machining; and a second polygon machining step in
(Continued)

which the main axis and the tool main axis are synchronously rotated such that the rotation speed of the main axis and the tool main axis are at a ratio required for the second polygon machining, and polygon machining is carried out.

3 Claims, 5 Drawing Sheets

(52) U.S. Cl.
CPC ....... *B23B 2265/16* (2013.01); *B23B 2265/32* (2013.01); *G05B 2219/45236* (2013.01); *Y10T 82/10* (2015.01)

(56) References Cited

U.S. PATENT DOCUMENTS

| | | | | |
|---|---|---|---|---|
| 4,313,260 A * | 2/1982 | Yeo | ............ | B23P 19/04 29/33 J |
| 4,364,110 A * | 12/1982 | Hyatt | ............ | B60R 16/0373 700/180 |
| 4,402,202 A * | 9/1983 | Gombas | ............ | B21D 51/263 72/124 |
| 4,413,539 A * | 11/1983 | Ishizuka | ............ | B23B 3/06 29/36 |
| 4,692,071 A * | 9/1987 | Hirota | ............ | B23G 1/20 318/39 |
| 4,862,379 A * | 8/1989 | Fujimoto | ............ | G05B 19/414 700/169 |
| 5,022,293 A * | 6/1991 | Farkas | ............ | B23Q 1/5481 82/1.11 |
| 5,260,631 A | 11/1993 | Hayashida et al. | | |
| 5,355,062 A * | 10/1994 | Takizawa | ............ | B65G 43/08 318/568.1 |
| 6,175,439 B1 * | 1/2001 | Ozaki | ............ | G02B 26/121 359/196.1 |
| 6,438,446 B1 * | 8/2002 | Trachier | ............ | G05B 19/416 408/11 |
| 2009/0005910 A1 * | 1/2009 | Akita | ............ | B23P 19/066 700/275 |
| 2015/0036144 A1 * | 2/2015 | Shimizu | ............ | G01D 5/3473 356/450 |
| 2016/0116907 A1 * | 4/2016 | Makino | ............ | G05B 19/416 700/188 |

FOREIGN PATENT DOCUMENTS

| | | |
|---|---|---|
| JP | S63-30418 U | 2/1988 |
| JP | S63-099114 A | 4/1988 |
| JP | H06-170629 A | 6/1994 |
| JP | 2000-246531 A | 9/2000 |
| JP | 2004-074360 A | 3/2004 |
| JP | 2008-264937 A | 11/2008 |
| JP | 2011-161542 A | 8/2011 |
| JP | 5080120 B2 | 11/2012 |

OTHER PUBLICATIONS

Japan Patent Office, Office Action for Jaoanese patent application No. 2013-069445, Sep. 13, 2016.
International Search Report for PCT/JP2014/056040, Jun. 10, 2014.
Taiwan Intellectual Property Bureau Ministry of Economic Affairs, Office Action for Taiwanese patent application No. 103109601, Mar. 1, 2017.

* cited by examiner

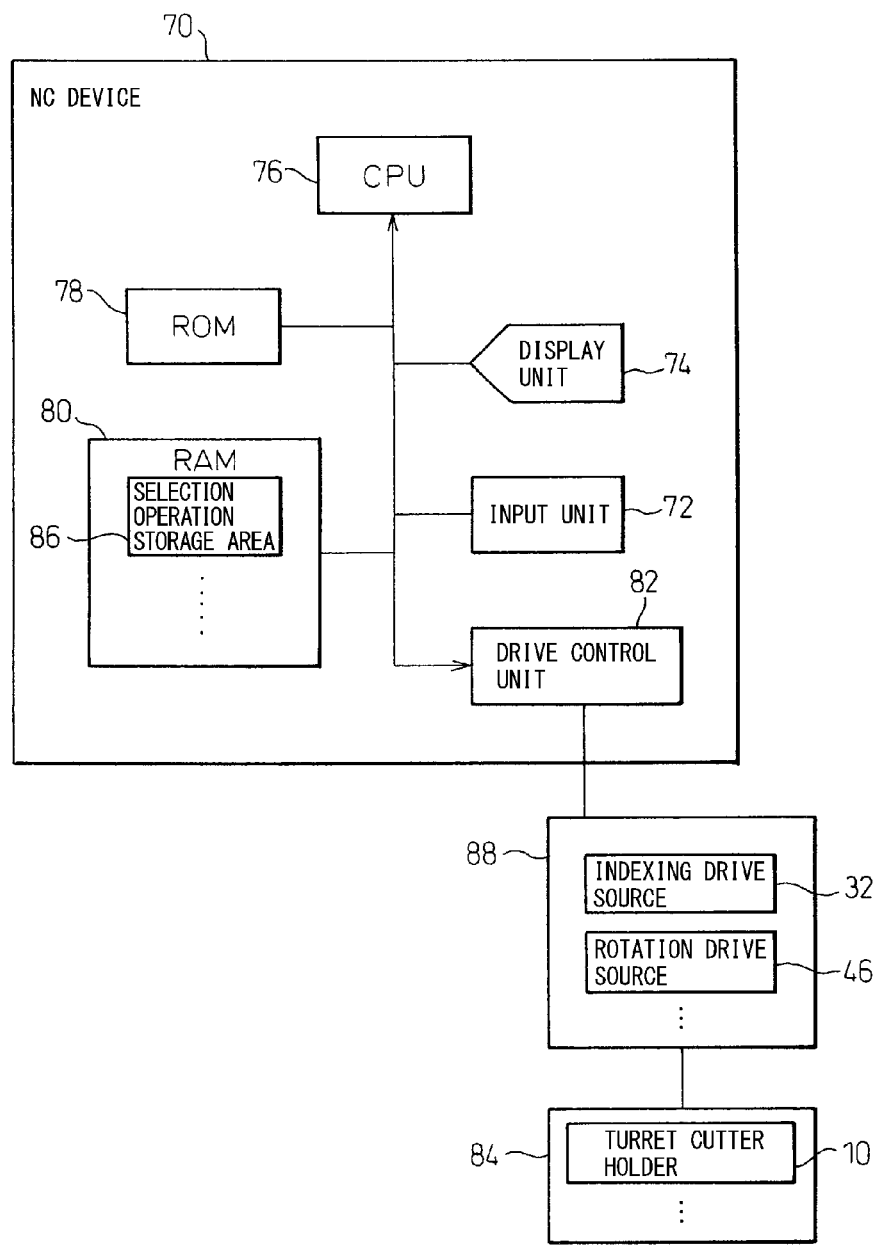

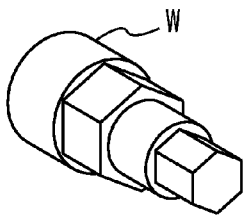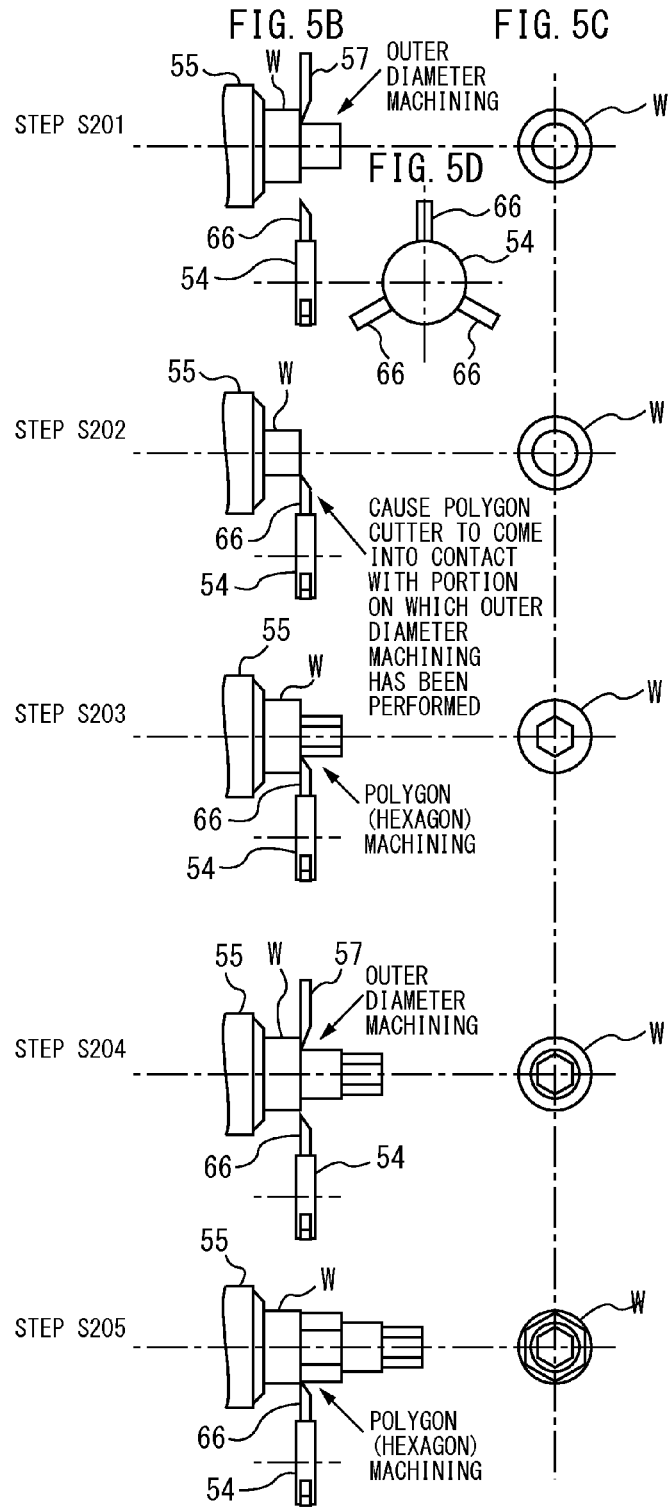

POLYGON MACHINING DEVICE AND POLYGON MACHINING METHOD

FIELD

The present invention relates to a polygon machining device and a polygon machining method.

BACKGROUND

Polygon machining in which the outer peripheral surface of a workpiece is machined into a polygon or the like by using a polygon cutter is conventional. Polygon machining is carried out by rotating a workpiece gripped by a main shaft about the shaft line and by synchronously rotating the polygon cutter mounted to a tool spindle in a predetermined rotation ratio with respect to the workpiece.

There is a polygon machining method in which polygon machining is carried out after matching the phase of a workpiece with that of the polygon cutter between each piece of the polygon machining in the case where a plurality of kinds of polygon machining is carried out on the outer peripheral surface of a workpiece (e.g., see Patent Document 1).

RELATED DOCUMENTS

[Patent Document 1] Japanese Patent No. 5080120

SUMMARY

Technical Problem

As described above, in the case where the polygon machining is carried out on the outer peripheral surface of a workpiece, first, it is necessary to carry out first polygon machining on the workpiece, then carry out deburring machining or the like to remove burrs generated on the outer peripheral surface of the workpiece in the first polygon machining on the workpiece on which the first polygon machining has been carried out, and to carry out second polygon machining to remove burrs generated on the inner peripheral surface of the workpiece in the first polygon machining on the workpiece on which the deburring machining or the like has been carried out after rotating the polygon cutter so that the position of the origin set on the rotary tool table and the polygon cutter are relatively in a predetermined arrangement relationship, and therefore there is a drawback in that the number of processes at the time of machining increases.

An object of the present invention is to provide a polygon machining device and a polygon machining method for carrying out a plurality of pieces of polygon machining on a workpiece gripped by a main shaft that rotates by using a polygon cutter mounted to a tool spindle that rotates in synchronization with the main shaft.

Solution to Problem

In order to implement the above-described object, according to the present invention, in a polygon machining device including a main shaft gripping a workpiece, a tool spindle to which a polygon cutter is mounted, and a control unit configured to control the rotation of the main shaft and the tool spindle, being configured so as to carry out machining by a tool other than the polygon cutter after carrying out first polygon machining by the polygon cutter and to carry out second polygon machining by the polygon cutter after the machining, and carrying out machining of a workpiece while maintaining a phase relationship between the main shaft and the tool spindle by synchronously rotating the main shaft and the tool spindle, the control unit includes a synchronization ratio changing unit configured to change a ratio of synchronization between a ratio of synchronization necessary for the first or second polygon machining and a second ratio of synchronization in which the main shaft can rotate at a rotation speed necessary for machining after the first polygon machining by rotating the tool spindle at a rotation speed not exceeding a maximum rotation speed, and the control unit is configured so as to carry out machining by synchronously rotating the main shaft and the tool spindle in the second ratio after the first polygon machining and to carry out second polygon machining by changing the ratio of synchronization after the machining after the first polygon machining.

The synchronization ratio changing unit is configured so as to change the ratio of synchronization at the timing when the rotation position of the main shaft is located at a predetermined fixed point.

Further, the second ratio is set so that the rotation speed of the main shaft is higher than the rotation speed of the tool spindle.

According to the present invention, a polygon machining method for carrying out machining by a tool other than a polygon cutter on a workpiece gripped by a main shaft that rotates after carrying out first polygon machining by the polygon cutter mounted to a tool spindle that rotates in synchronization with the main shaft while maintaining a phase relationship between the main shaft and the tool spindle, and for carrying out second polygon machining by the polygon cutter after the machining while maintaining the phase relationship between the main shaft and the tool spindle includes a first polygon machining step of carrying out first polygon machining by synchronously rotating the main shaft and the tool spindle so that the rotation speed of the main shaft and the rotation speed of the tool spindle form a ratio necessary for the first polygon machining, a machining step of carrying out machining on the workpiece on which the first polygon machining has been carried out by synchronously rotating the main shaft and the tool spindle after changing the ratio to a second synchronization ratio in which the main shaft can rotate at a rotation speed necessary for the machining after the first polygon machining by rotating the tool spindle at a rotation speed not exceeding a maximum rotation speed after the first polygon machining step, and a second polygon machining step of carrying out second polygon machining by synchronously rotating the main shaft and the tool spindle so that the rotation speed of the main shaft and the rotation speed of the tool spindle form a ratio necessary for the second polygon machining after the machining step.

Advantageous Effects of Invention

According to the present invention, it is possible to implement a polygon machining device and a polygon machining method for carrying out polygon machining on a workpiece gripped by a main shaft that rotates by using a polygon cutter mounted to a tool spindle that rotates in synchronization with the main shaft. According to the present invention, in the case where two kinds of polygon machining are carried out on the outer peripheral surface of a workpiece, it is possible to easily match the phase of the workpiece with the phase of the polygon cutter at both points in time, and therefore it is possible to accurately form a plurality of polygonal shapes in a predetermined phase relationship on the outer peripheral surface of the workpiece.

BRIEF DESCRIPTION OF THE DRAWINGS

FIG. 2A is a partial cutout side view and FIG. 2B is a partial cutout front view;

FIG. 3 is a block diagram illustrating a control unit capable of carrying out the polygon machining method according to the embodiment of the present invention;

FIGS. 5A to 5D are diagrams explaining an example in which two kinds of polygon machining are carried out by the polygon machining method according to the embodiment of the present invention.

DESCRIPTION OF EMBODIMENTS

Figure 1:
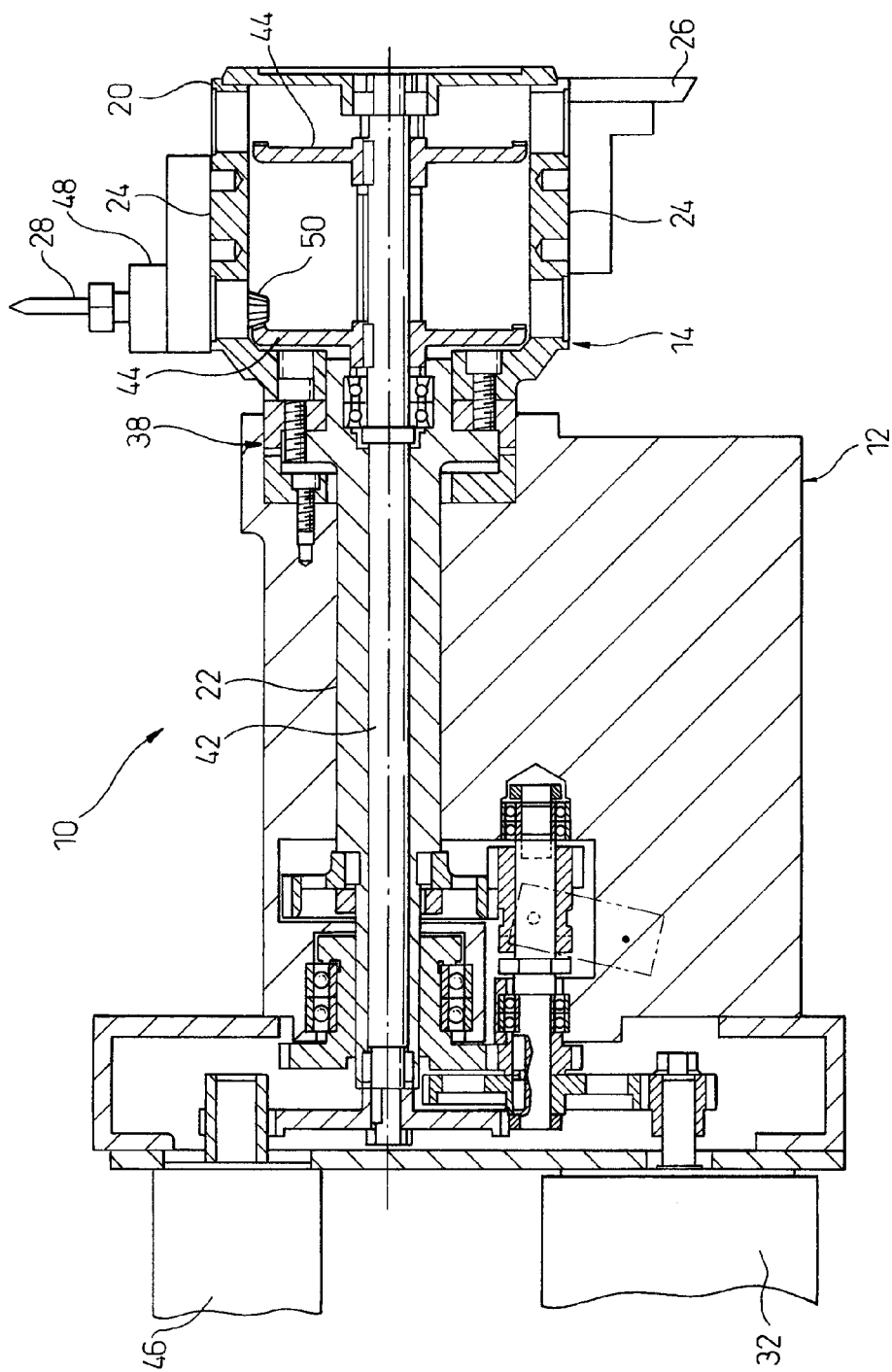
FIG. 1 is a section view illustrating an example of a configuration of a turret cutter holder that is mounted on a machine tool to which a polygon machining device according to the present invention can be applied.
Figure 2A:
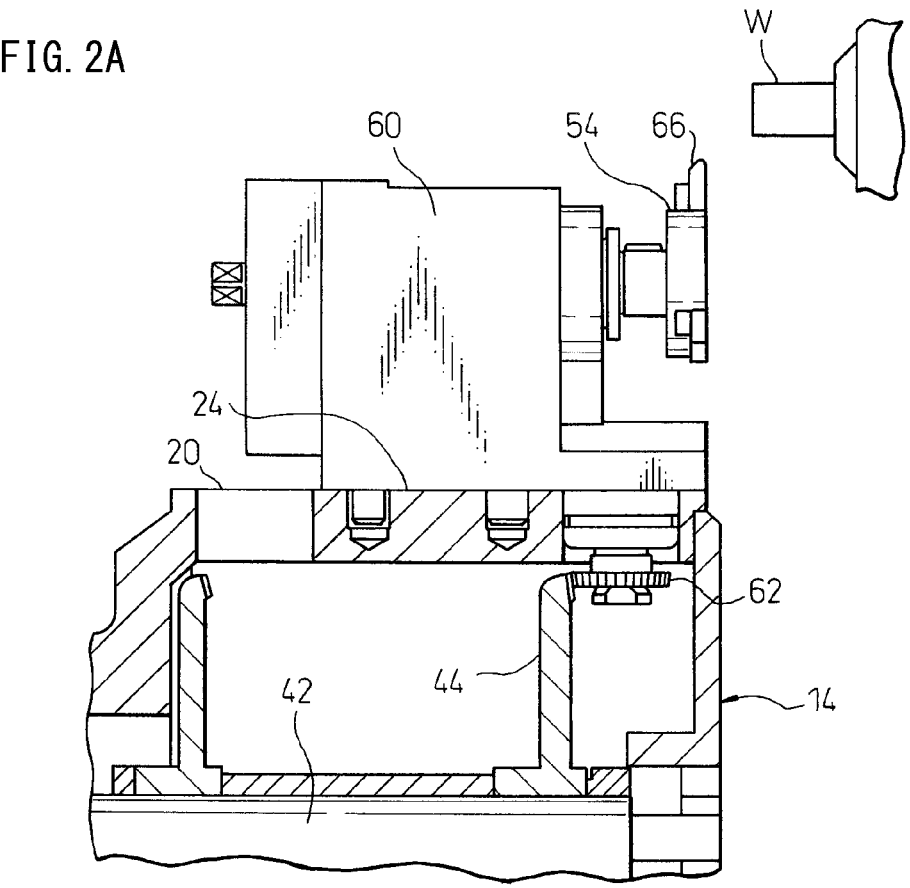
FIGS. 2A and 2B are diagrams illustrating a state where a polygon cutter that is used in the polygon machining device according to an embodiment of the present invention is mounted to the turret cutter holder illustrated in FIG. 3.
Figure 2B:
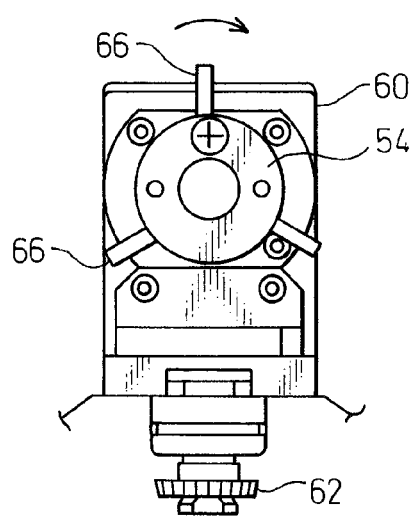

FIG. 1 is a section view illustrating an example of a configuration of a turret cutter holder that is mounted on a machine tool to which a polygon machining device according to the present invention can be applied. FIGS. 2A and 2B are diagrams illustrating a state where a polygon cutter that is used in the polygon machining device according to an embodiment of the present invention is mounted to the turret cutter holder illustrated in FIG. 3, and FIG. 2A is a partial cutout side view and FIG. 2B is a partial cutout front view. A turret cutter holder 10 is mounted on an automatic lathe, such as an NC lathe, which is a machine tool. The turret cutter holder 10 includes a cutter table main body 12 and a turret 14 that is supported revolvably by the cutter table main body 12.

The turret 14 has a hollow head part 20 having an outline in the shape of a column or prism and a shaft part 22 in the shape of a hollow cylinder extended concentrically in the shaft line direction from one end in the shaft line direction of the head part 20. On the outer peripheral surface of the head part 20 of the turret 14, a plurality of tool mount parts 24 to which a tool is mounted is provided for each predetermined indexed angle. It is possible to selectively mount a machining tool, such as a cutting tool 26, and a rotary tool 28, such as a drill and a milling cutter, to each tool mount part 24. The shaft part 22 is supported by the cutter table main body 12 rotatably and movably in the shaft line direction.

The turret 14 is engaged with the cutter table main body 12 so as to be capable of being disengaged therefrom via an engagement part 38, and by disengaging the engagement part 38 by a servomotor 32 and by rotationally driving the shaft part 22, the turret 14 is driven revolvably. The turret 14 is fixed in the indexed position on the cutter table main body 12, and therefore it is possible to select a predetermined machining tool, by causing the engagement part 38 to engage in a predetermined revolving position of the turret 14.

Within the shaft part 22, a drive shaft 42 that is driven rotationally by a servomotor 46 is supported pivotally. When the rotary tool 28 is mounted to the desired tool mount part 24 of the turret 14 via a holder 48 including the tool spindle, a driven gear 50 that is linked to the tool spindle engages with a drive gear 44 attached to the drive shaft 42 and the rotary tool 28 is driven rotationally by the servomotor 46.

To the predetermined tool mount part 24, as illustrated in FIG. 2, it is possible to mount a polygon cutter 54 via a holder 60 including the tool spindle. When the polygon cutter 54 is mounted to the tool spindle of the holder 60 and a driven gear 62 that is linked to the polygon cutter 54 (tool spindle) via the power transmission within the holder 60 engages with the drive gear 44, the polygon cutter 54 is driven rotationally by the servomotor 46.

It is possible to form an ellipse, a polygon, etc., on the outer peripheral surface of a workpiece W by carrying out polygon machining on the workpiece W gripped by the main shaft, by revolving the turret 14 to select the polygon cutter 54 and by synchronously rotating the main shaft that is driven rotationally by the main shaft motor and the polygon cutter 54 to maintain the phase relationship between the main shaft and the polygon cutter 54. In the polygon machining, the tool spindle and the main shaft are driven rotationally so that the rotation speed of the workpiece W and the rotation speed of the polygon cutter 54 form a predetermined ratio. For example, in the case where a quadrangle is formed on the outer peripheral surface of the workpiece, it is possible to machine the quadrangle by rotating the polygon cutter in which two cutters, the number of cutters being half the number of angles of the quadrangle, are arranged twice while rotating the workpiece once. Further, for example, in the case where a hexagon is formed on the outer peripheral surface of the workpiece, it is sufficient to rotate the polygon cutter in which three cutters, the number of cutters being half the number of angles of the hexagon, are arranged so as to form, for example, a triangle three times while rotating the workpiece once.

It is possible to carry out general cutting machining of the workpiece W with the shaft line of the main shaft as a center, by revolving the turret 14 to select the cutting tool 26. For example, there is outer diameter machining of a workpiece using an outer diameter cutting tool or deburring machining to remove burrs generated on the outer peripheral surface of a workpiece. In the cutting machining, the polygon cutter 54 is not used, and therefore the synchronization between the main shaft and the tool spindle is not required and it is possible to set the rotation speed of the main shaft to a speed higher than that at the time of the polygon machining in an attempt to reduce the time taken by the workpiece machining. Normally, the maximum rotation speed of the tool spindle is set lower than the maximum rotation speed of the main shaft, and therefore in the case where the main shaft and the tool spindle are in synchronization, the maximum rotation speed of the main shaft is restricted by the maximum rotation speed of the tool spindle as a result. Thus, in the case of the above-described cutting machining, the synchronization between the main shaft and the tool spindle is released and the main shaft is driven rotationally at a rotation speed necessary for the cutting machining independently of the tool spindle.

FIG. 3 is a block diagram illustrating a control unit capable of carrying out the polygon machining method according to the embodiment of the present invention. The drive of the tool spindle and the main shaft is controlled by the control unit illustrated in FIG. 3. The control unit includes an NC device 70 mounted on a numerical control (NC) lathe in the present embodiment. However, it is also possible to use another control device different from the NC device.

The NC device 70 includes an input unit 72, a display unit 74, a processing unit (CPU) 76, a storage unit (ROM 78 and RAM 80), a drive control unit 82, etc.

In the control device (NC device 70), the CPU 76 outputs an operation command to the drive control unit 82 based on various kinds of data, machining programs, etc., stored in the ROM 78 or the RAM 80, and the control unit 82 controls the indexing drive source (servomotor) 32 and the rotation drive source (servomotor) 46 of the turret cutter holder 10 and, a drive mechanism 88, such as a main shaft motor that drives the main shaft rotationally, respectively, and causes the turret 14 to revolve and the rotary tool 28 (tool spindle) and the main shaft to rotate. The control device is configured so as to be capable of switching between the synchronous drive and the asynchronous drive of the servomotor 46 (rotational drive of the rotary tool 28) and the main shaft motor (rotational drive of the main shaft).

Figure 4:
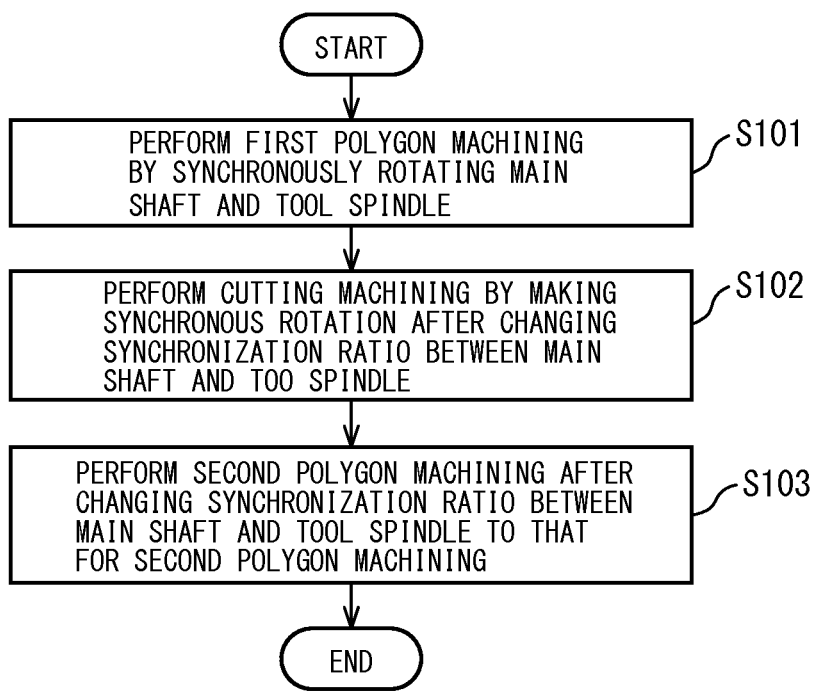
FIG. 4 is a flowchart showing an operation flow of the polygon machining method according to the embodiment of the present invention.

FIG. 4 is a flowchart illustrating an operation flow of the polygon machining method according to the embodiment of the present invention. Hereinafter, the synchronization ratio between the main shaft and the tool spindle, i.e., the ratio of rotation speed in the state where synchronization is maintained is explained by using a term "ratio", such as a "first ratio" and a "second ratio".

First, at step S101, first polygon machining is carried out by the polygon cutter 54 by synchronously rotating the main shaft and the tool spindle so that the rotation speed of the main shaft gripping the workpiece W and the rotation speed of the tool spindle to which the polygon cutter 54 is mounted have a first ratio. The first ratio is set to a value that is necessary for carrying out polygon machining to obtain a necessary machined shape (e.g., a polygon).

After the first polygon machining, cutting machining is carried out on the workpiece on which the first polygon machining has been carried out by synchronously rotating the main shaft and the tool spindle so that the rotation speed of the main shaft and the rotation speed of the tool spindle have a second ratio different from the first ratio at the time of the first polygon machining. At the time of the cutting machining at step S102, the polygon cutter mounted to the tool spindle is retracted in advance. The "second ratio" used in the cutting machining is explained as follows.

In the cutting machining, the polygon cutter 54 is not used, and therefore the synchronization between the main shaft and the tool spindle is not necessary and it is possible to set the rotation speed of the main shaft to a speed higher than that at the time of the polygon machining in an attempt to reduce the time taken by the workpiece machining. For example, in the case where the diameter of material is small, such as a thin workpiece, setting the rotation speed of the workpiece at the time of cutting to a higher speed will be more efficient. On the other hand, the permitted maximum rotation speed of the tool spindle to which the polygon cutter is mounted is lower than the permitted maximum rotation speed of the main shaft gripping the workpiece. Thus, in the case where the cutting machining is carried out by making synchronous rotation while maintaining the above-described first ratio between the rotation speed of the main shaft and the rotation speed of the tool spindle at the time of the polygon machining at step S101, the rotation speed of the main shaft is restricted by the permitted maximum rotation speed of the tool spindle in synchronization, and therefore it is not possible to set the rotation speed of the workpiece to a sufficiently high speed. As a result, in the present invention, at the time of the cutting machining at step S102, the synchronization ratio between the main shaft and the tool spindle is set so that the rotation speed of the main shaft, which is necessary when carrying out the cutting machining, falls within a range that does not exceed the maximum rotation speed permitted for the tool spindle in synchronization. In one example, in the case where a quadrangle is formed on the outer peripheral surface of the workpiece, in the first polygon machining at step S101, synchronization is established so that the polygon cutter is rotated twice while the workpiece is rotated once, but in the cutting machining at step S102, synchronization is established so that the polygon cutter rotates once while the workpiece is rotated, for example, five times, and in this manner, the synchronization ratio is changed between the polygon machining and the cutting machining.

After the cutting machining at step S102, at step S103, the second polygon machining is carried out by the polygon cutter by synchronously rotating the main shaft and the tool spindle so that the rotation speed of the main shaft and the rotation speed of the tool spindle have a ratio necessary for the second polygon machining. It is possible to set the ratio at the time of the second polygon machining to the same ratio as the first ratio at step S101.

The polygon machining device that carries out each piece of the above-described processing includes the main shaft that grips a workpiece, the tool spindle to which a polygon cutter is mounted, and the control unit configured to control the rotation of the main shaft and the tool spindle. The control unit controls the rotation of the main shaft and the tool spindle so as to carry out each piece of the above-described processing: the processing (step S101) to carry out the first polygon machining on the workpiece by the polygon cutter by carrying out control to synchronously rotate the main shaft and the tool spindle so that the rotation speed of the main shaft and the rotation speed of the tool spindle have the above-described first ratio necessary to carry out the first polygon machining; the processing (S102) to carry out the cutting machining on the workpiece on which the first polygon machining has been carried out by carrying out control to synchronously rotate the main shaft and the tool spindle so that the rotation speed of the main shaft and the rotation speed of the tool spindle have the above-described second ratio after the first polygon machining; and the processing (step S103) to carry out the second polygon machining by the polygon cutter on the workpiece on which the cutting machining has been carried out by carrying out control to synchronously rotate the main shaft and the tool spindle so that the rotation speed of the main shaft and the rotation speed of the tool spindle have the ratio necessary to carry out the second polygon after the cutting machining. In the cutting machining at step S103, the rotation speed of the main shaft having the second ratio with respect to the rotation speed of the tool spindle is set so that the rotation speed of the main shaft that is necessary for the cutting machining falls within a range in which the rotation speed of the tool spindle does not exceed the maximum rotation speed permitted for the tool spindle.

As explained above, in the first polygon machining at step S101, the synchronous rotation is made in the first ratio that is necessary for the first polygon machining, in the cutting machining by a tool other than the polygon cutter at step S102, the synchronous rotation is made in the second ratio so that the main shaft can rotate at the rotation speed that is necessary for the cutting machining even if the tool spindle is rotated at a rotation speed lower than the maximum rotation speed, and in the second polygon machining by the polygon cutter at step S103, the synchronous rotation is made in the ratio that is necessary for the second polygon machining. It is also possible to carry out a setting so that the synchronous rotation is made in the first ration at the time of the second polygon machining. The processing at each step is carried out without stopping the synchronous rotation of the main shaft and the tool spindle, and therefore the workpiece and the polygon cutter are rotating in synchronization at all times and in the case where the two kinds of polygon machining are carried out on the outer peripheral surface of the workpiece, it is possible to easily match the phase of the workpiece with that of the polygon cutter, and therefore it is possible to form a plurality of polygonal shapes both accurately and quickly in the predetermined phase relationship on the outer peripheral surface of the workpiece.

The phase relationship between the main shaft and the tool spindle becomes constant at all times at a predetermined fixed point, by designing the configuration so that the synchronization ratio is changed when the main shaft is located at a predetermined fixed point, for example, the main shaft origin where the rotation angle of the main shaft becomes 0 degrees, and therefore it is possible to easily match the phase at the time of the first polygon machining with the phase at the time of the second polygon machining at the timing when the main shaft is located at the predetermined fixed point. It is also possible to change the synchronization ratio continuously at the predetermined fixed point, or to change the synchronization ratio after temporarily stopping the main shaft. It is possible to maintain the phase relationship between the main shaft and the tool spindle both easily and securely, and by continuously changing the synchronization ratio at the predetermined fixed point, by changing the synchronization ratio after temporarily stopping the main shaft, it is possible to carry out machining smoothly and continuously, and in addition to this, there is an advantage that the amount of power consumed to drive the main shaft and the tool spindle is smaller than that in the case where the rotation is stopped completely.

FIGS. 5A to 5D are diagrams explaining an example in which two kinds of polygon machining are carried out on the workpiece W gripped by the main shaft by using the polygon cutter 54 linked to the tool spindle and including three cutters 66 by the polygon machining method according to the embodiment of the present invention. The case is explained where two hexagons different in size are formed in the same phase on the outer peripheral surface of the workpiece W as illustrated in FIG. 5A.

First, at step S201, an outer diameter cutting tool 57 is indexed and the workpiece W gripped by the main shaft is guided by a guide bush 55 and outer diameter machining (cutting machining) is carried out on the workpiece W. Next, at step S202, the polygon cutter 54 is indexed and the first polygon machining to form a hexagon is carried out on the portion of the workpiece W on which the outer diameter machining has been carried out as illustrated at step S203. In the first polygon machining at step S203, the main shaft and the tool spindle are synchronously rotated in the first ratio necessary for the first polygon machining. Next, at step S204, the outer diameter cutting tool 57 is indexed and the outer diameter machining (cutting machining) is carried out on the workpiece W. In the cutting machining at step S204 by the outer diameter cutting tool 57, which is a tool other than the polygon cutter, the synchronous rotation is made in the second ratio so that the main shaft can rotate at the rotation speed necessary for the cutting machining even if the tool spindle is rotated at a rotation speed lower than the maximum rotation speed. Then, as illustrated at step S205, the polygon cutter 54 is indexed and the second polygon machining to form a hexagon on the workpiece W is carried out. In the second polygon machining at step S205, the main shaft and the tool spindle are synchronously rotated in the ratio necessary for the second polygon machining. In the case of the present embodiment, in order to form similar hexagons in the same phase by the first polygon machining and the second polygon machining, at the time of the second polygon machining, the synchronous rotation is made in the first ratio, which is the same as that in the case of the first polygon machining. The phase of the polygon cutter 54 is the same as the phase of the workpiece W when carrying out the first polygon machining and the second polygon machining, and therefore it is possible to carry out the second polygon machining in the predetermined phase with respect to the first polygon machining.

Even in the case where cutting machining in which the phase of the polygon cutter 54 (tool spindle) and the phase of the workpiece W (main shaft) are not related is carried out between the first polygon machining and the second polygon machining, it is possible to easily carry out the polygon machining having the predetermined phase relationship therebetween on the outer peripheral surface of the workpiece W only by changing the synchronization ratio between the main shaft and the tool spindle.

CITATION LIST 10 turret cutter holder
12 cutter table main body
14 turret
20 head part
22 shaft part
24 tool mount parts
26 cutting tool
28 rotary tool
32 servomotor
38 engagement part
42 drive shaft
44 drive gear
46 servomotor
48 holder
50 driven gear
54 polygon cutter
55 guide bush
57 outer diameter cutting tool
60 holder
62 driven gear
66 cutters
70 NC device
72 input unit
74 display unit
76 CPU
78 ROM
80 RAM
82 drive control unit
84 movable structure
86 drive mechanism
W workpiece

What is claimed is:
1. A polygon machining device comprising a main shaft gripping a workpiece, a tool spindle to which a polygon cutter is mounted, and a control unit configured to control the rotation of the main shaft and the tool spindle, being configured so as to carry out machining by a tool other than the polygon cutter on the workpiece after carrying out first polygon machining by the polygon cutter and to carry out second polygon machining by the polygon cutter after the machining, and carrying out machining on the workpiece by synchronously rotating the main shaft and the tool spindle to maintain a phase relationship between the main shaft and the tool spindle, wherein the control unit includes a synchronization ratio changing unit configured to make the phase relationship between the main shaft and the tool spindle constant at a predetermined fixed point by changing a synchronization ratio, at timing when a rotation position of the main shaft is located at the predetermined fixed point, between a synchronization ratio necessary for the first or second polygon machining and a second synchronization ratio in which the main shaft can rotate at a rotation speed necessary for the machining after the first polygon machining by rotating the tool spindle at a rotation speed not exceeding a maximum rotation speed, and the control unit is configured so as to carry out machining by synchronously rotating the main shaft and the tool spindle in the second ratio after the first polygon machining and to carry out the second polygon machining by changing the synchronous ratio after the machining after the first polygon machining.

2. The polygon machining device according to claim 1, wherein the second ratio is set so that the rotation speed of the main shaft is higher than the rotation speed of the tool spindle.

3. A polygon machining method for carrying out machining by a tool other than a polygon cutter on a workpiece gripped by a main shaft that rotates after carrying out first polygon machining by the polygon cutter mounted to a tool spindle that rotates in synchronization with the main shaft while maintaining a phase relationship between the main shaft and the tool spindle, and for carrying out second polygon machining by the polygon cutter after the machining while maintaining the phase relationship between the main shaft and the tool spindle, the method comprising:

a first polygon machining step of carrying out the first polygon machining by synchronously rotating the main shaft and the tool spindle so that the rotation speed of the main shaft and the rotation speed of the tool spindle form a ratio necessary for the first polygon machining;

a machining step of carrying out, after the first polygon machining step, machining on the workpiece on which the first polygon machining has been carried out by synchronously rotating the main shaft and the tool spindle after changing the synchronous ratio to a second synchronous ratio in which the main shaft can rotate at a rotation speed necessary for the machining after the first polygon machining by rotating the tool spindle at a rotation speed not exceeding a maximum rotation speed; and a second polygon machining step of carrying out, after the machining step, the second polygon machining by synchronously rotating the main shaft and the tool spindle so that the rotation speed of the main shaft and the rotation speed of the tool spindle form a ratio necessary for the second polygon machining, and the synchronization ratio is changed at timing when a rotation position of the main shaft is located at a predetermined fixed point so that the phase relationship between the main shaft and the tool spindle becomes constant at the predetermined fixed point.

* * * * *